US011982965B2

(12) United States Patent
Tanaka et al.

(10) Patent No.: US 11,982,965 B2
(45) Date of Patent: May 14, 2024

(54) IMAGE FORMING APPARATUS CAPABLE OF ACQUIRING POTENTIAL VALUE OF EXPOSED AREA ON IMAGE-CARRYING MEMBER, POTENTIAL VALUE ACQUISITION METHOD

(71) Applicant: KYOCERA Document Solutions Inc., Osaka (JP)

(72) Inventors: Kazunori Tanaka, Osaka (JP); Yoshihiro Yamagishi, Osaka (JP); Tamotsu Shimizu, Osaka (JP); Kazuhiro Nakachi, Osaka (JP); Ryota Okui, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/050,783

(22) Filed: Oct. 28, 2022

(65) Prior Publication Data

US 2023/0137321 A1 May 4, 2023

(30) Foreign Application Priority Data

Oct. 29, 2021 (JP) ................................ 2021-177420

(51) Int. Cl.
*G03G 15/08* (2006.01)
*G03G 15/00* (2006.01)
*G03G 15/02* (2006.01)

(52) U.S. Cl.
CPC ....... *G03G 15/553* (2013.01); *G03G 15/0266* (2013.01); *G03G 15/5037* (2013.01)

(58) Field of Classification Search
USPC ........................................................... 399/27
See application file for complete search history.

(56) References Cited

U.S. PATENT DOCUMENTS

2007/0166057 A1* 7/2007 Moriya ................ G03G 15/751 399/26
2019/0354043 A1 11/2019 Odagiri
2021/0149320 A1* 5/2021 Shimizu ............. G03G 15/5037
2021/0173321 A1* 6/2021 Fukushima ........ G03G 15/0266

FOREIGN PATENT DOCUMENTS

JP 2019200290 A 11/2019

* cited by examiner

*Primary Examiner* — Quana Grainger
(74) *Attorney, Agent, or Firm* — Alleman Hall & Tuttle LLP

(57) ABSTRACT

An image forming apparatus includes a developing member, a first detection processing portion, and an acquisition processing portion. The developing member conveys developer to a facing portion between the developing member and the image-carrying member. The first detection processing portion detects a first development current for each of a plurality of specific voltages with different DC voltage values applied to the developing member, the first development current flowing, in response to application of the specific voltages, through the facing portion including the developer and a specific exposed area, formed by the light emitting portion, on the image-carrying member. The acquisition processing portion acquires a potential value of the specific exposed area based on the DC voltage values of the specific voltages and current values of the first development current, detected by the first detection processing portion, corresponding to the respective specific voltages.

19 Claims, 6 Drawing Sheets

| DEVELOPMENT BIAS VOLTAGE (DC COMPONENT ONLY)[V] | FIRST DEVELOPMENT CURRENT[μA] |
| --- | --- |
| 100 | -0.14 |
| 120 | 0.01 |
| 140 | 0.27 |

IMAGE FORMING APPARATUS CAPABLE OF ACQUIRING POTENTIAL VALUE OF EXPOSED AREA ON IMAGE-CARRYING MEMBER, POTENTIAL VALUE ACQUISITION METHOD

INCORPORATION BY REFERENCE

This application is based upon and claims the benefit of priority from the corresponding Japanese Patent Application No. 2021-177420 filed on Oct. 29, 2021, the entire contents of which are incorporated herein by reference.

BACKGROUND

The present disclosure relates to an electrophotographic image forming apparatus and to a potential value acquisition method.

An electrophotographic image forming apparatus includes an image-carrying member such as a photoconductor drum, a charging member such as a charging roller, a light emitting portion such as a laser scanning unit, a developing member such as a developing roller, and a transfer member such as a transfer roller. The charging member charges the image-carrying member. The light emitting portion forms electrostatic latent images on a charged area, formed by the charging member, on the image-carrying member. The developing member develops the electrostatic latent images formed by the light emitting portion using developer that contains toner. The transfer member transfers toner images formed by the developing member.

A known image forming apparatus according to a related art can calculate the potential value of the exposed area, formed by the light emitting portion, on the image-carrying member. Specifically, in the image forming apparatus, a transfer current flowing in the transfer member and varying depending on a transfer voltage, which is applied to the transfer member and changed in a phased manner, and a charging current flowing in the charging member are acquired for each of two charging voltages applied to the charging member for calculation of the potential value of the exposed area.

SUMMARY

An image forming apparatus according to an aspect of the present disclosure includes a charging member, a light emitting portion, a developing member, a first detection processing portion, and an acquisition processing portion. The charging member is configured to charge an image-carrying member. The light emitting portion is configured to emit light that illuminates a charged area, formed by the charging member, on the image-carrying member. The developing member faces the image-carrying member and is configured to convey developer to a facing portion between the developing member and the image-carrying member. The first detection processing portion is configured to detect a first development current for each of a plurality of specific voltages with DC voltage values that differ from each other applied to the developing member, the first development current flowing, in response to application of the specific voltages, through the facing portion including the developer and a specific exposed area set in advance, formed by the light emitting portion, on the image-carrying member. The acquisition processing portion is configured to acquire a potential value of the specific exposed area based on the DC voltage values of the specific voltages and current values of the first development current, detected by the first detection processing portion, corresponding to the respective specific voltages.

A potential value acquisition method according to another aspect of the present disclosure, executed by an image forming apparatus including a charging member configured to charge an image-carrying member; a light emitting portion configured to emit light that illuminates a charged area, formed by the charging member, on the image-carrying member; and a developing member facing the image-carrying member and configured to convey developer to a facing portion between the developing member and the image-carrying member, includes a detection step and an acquisition step. In the detection step, a first development current is detected for each of a plurality of specific voltages with DC voltage values that differ from each other applied to the developing member, the first development current flowing, in response to application of the specific voltages, through the facing portion including the developer and a specific exposed area set in advance, formed by the light emitting portion, on the image-carrying member. In the acquisition step, a potential value of the specific exposed area is acquired based on the DC voltage values of the specific voltages and current values of the first development current, detected in the detection step, corresponding to the respective specific voltages.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

Configuration of Image Forming Apparatus 100

First, the configuration of an image forming apparatus 100 according to an embodiment of the present disclosure will be described with reference to FIGS. 1 and 2.

For purposes of illustration, the vertical direction in a state where the image forming apparatus 100 is installed and ready for use (state shown in FIG. 1) is defined as an up-down direction D1. In addition, a front-rear direction D2 is defined on the premise that the face of the image forming apparatus 100 on the left side of the page in FIG. 1 serves as the front (front face). In addition, a left-right direction D3 is defined relative to the front of the image forming apparatus 100 in the installed state.

The image forming apparatus 100 is a multifunction peripheral with multiple functions such as a scan function of reading images from document sheets, a print function of forming images based on image data, a facsimile function, and a copy function. The present disclosure may be applied to image forming apparatuses, such as printers, facsimile apparatuses, and copiers, capable of forming images by an electrophotographic method.

Figure 1:
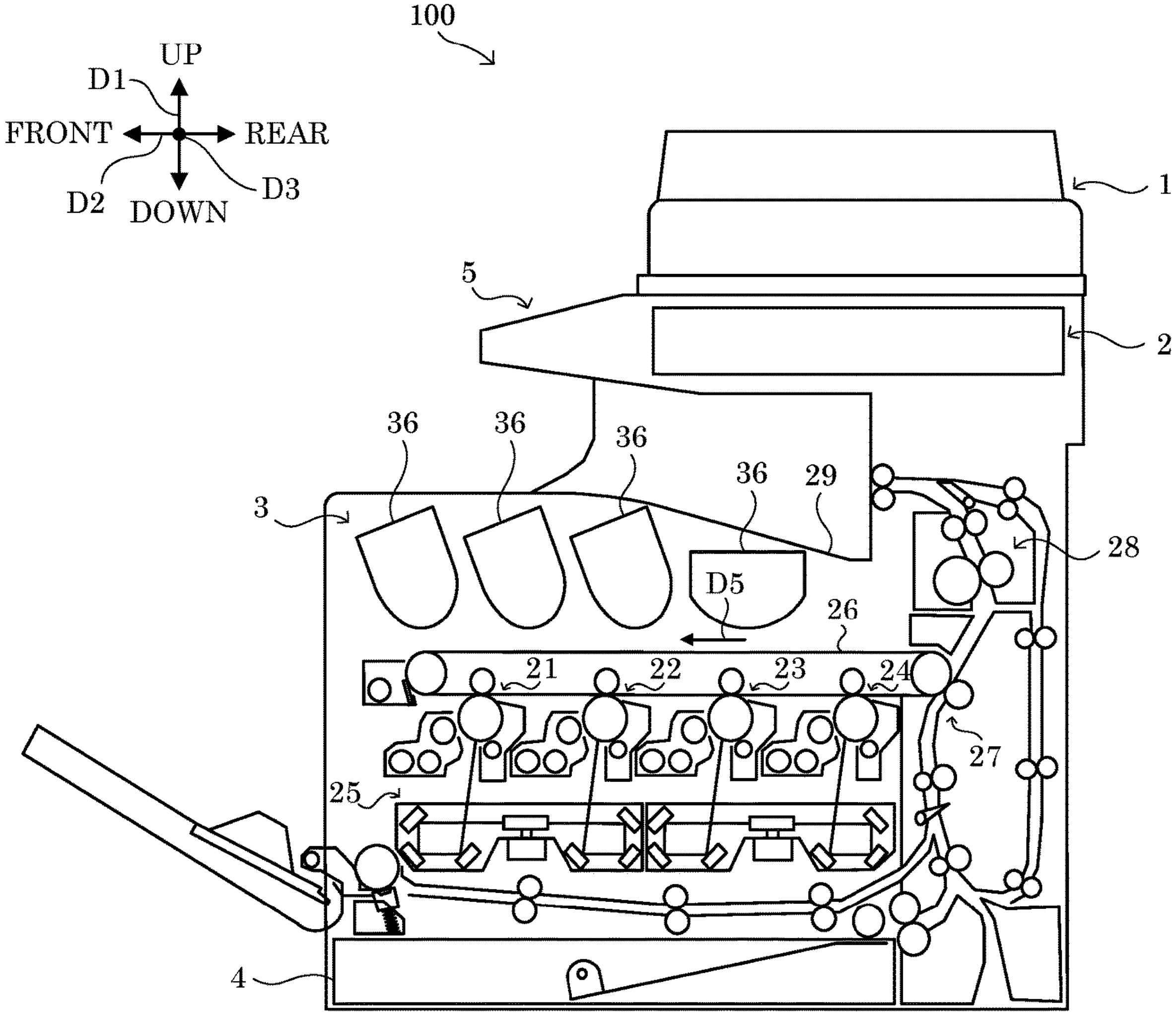
FIG. 1 is a cross-sectional view showing a configuration of an image forming apparatus according to an embodiment of the present disclosure.
Figure 2:
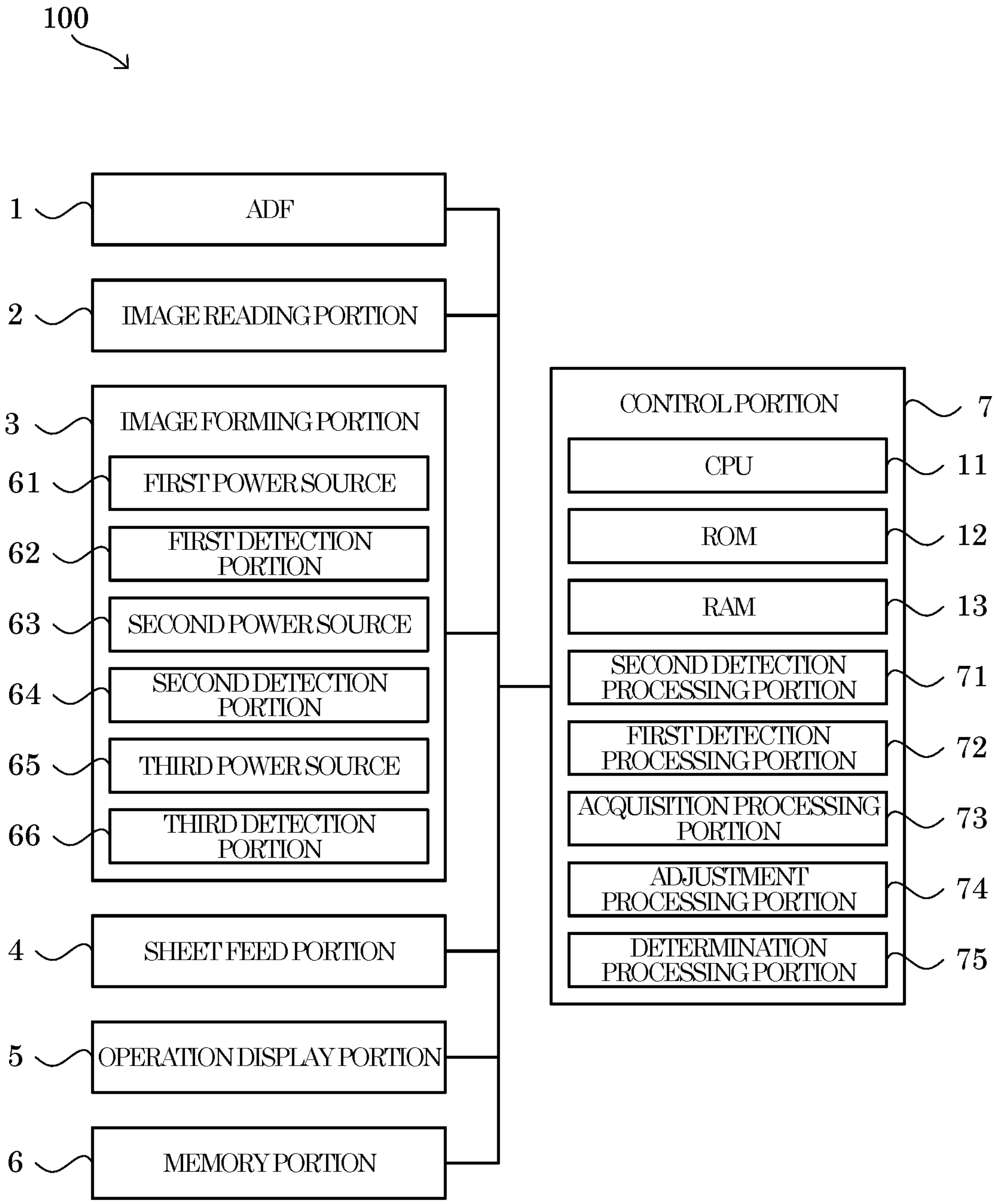
FIG. 2 is a block diagram showing a system configuration of the image forming apparatus according to the embodiment of the present disclosure.

As shown in FIGS. 1 and 2, the image forming apparatus 100 includes an ADF (Automatic Document Feeder) 1, an image reading portion 2, an image forming portion 3, a sheet feed portion 4, an operation display portion 5, a memory portion 6, and a control portion 7.

The ADF 1 feeds document sheets with images to be read by the image reading portion 2. The ADF 1 includes a document sheet set portion, a plurality of conveying rollers, a document sheet holder, and a sheet discharge portion.

The image reading portion 2 implements the scan function. The image reading portion 2 includes a document sheet table, a light source, a plurality of mirrors, an optical lens, and a CCD (Charge Coupled Device).

The image forming portion 3 implements the print function. Specifically, the image forming portion 3 forms color or monochrome images on sheets supplied from the sheet feed portion 4 by an electrophotographic method.

The sheet feed portion 4 supplies sheets for the image forming portion 3. The sheet feed portion 4 includes a sheet feed cassette, a manual feed tray, and a plurality of conveying rollers.

The operation display portion 5 is a user interface of the image forming apparatus 100. The operation display portion 5 includes a display portion and an operation portion. The display portion displays various types of information according to control instructions from the control portion 7. For example, the display portion is a liquid crystal display. The operation portion is used by a user for inputting various types of information to the control portion 7. For example, the operation portion includes operation keys and a touch panel.

The memory portion 6 is a nonvolatile storage device. For example, the memory portion 6 is nonvolatile memory such as flash memory.

The control portion 7 provides integrated control over the image forming apparatus 100. As shown in FIG. 2, the control portion 7 includes a CPU 11, a ROM 12, and a RAM 13. The CPU 11 is a processor that executes various types of calculation processes. The ROM 12 is a nonvolatile storage device that stores in advance information including control programs for causing the CPU 11 to execute various types of processes. The RAM 13 is a volatile or nonvolatile storage device used as a temporary memory (work area) for the various types of processes executed by the CPU 11. The CPU 11 executes the various types of control programs stored in the ROM 12 in advance to provide integrated control over the image forming apparatus 100.

The control portion 7 may be provided separately from a main control portion that provides integrated control over the image forming apparatus 100. In addition, the control portion 7 may be composed of an electronic circuit such as an integrated circuit (ASIC).

Configuration of Image Forming Portion 3

Figure 3:
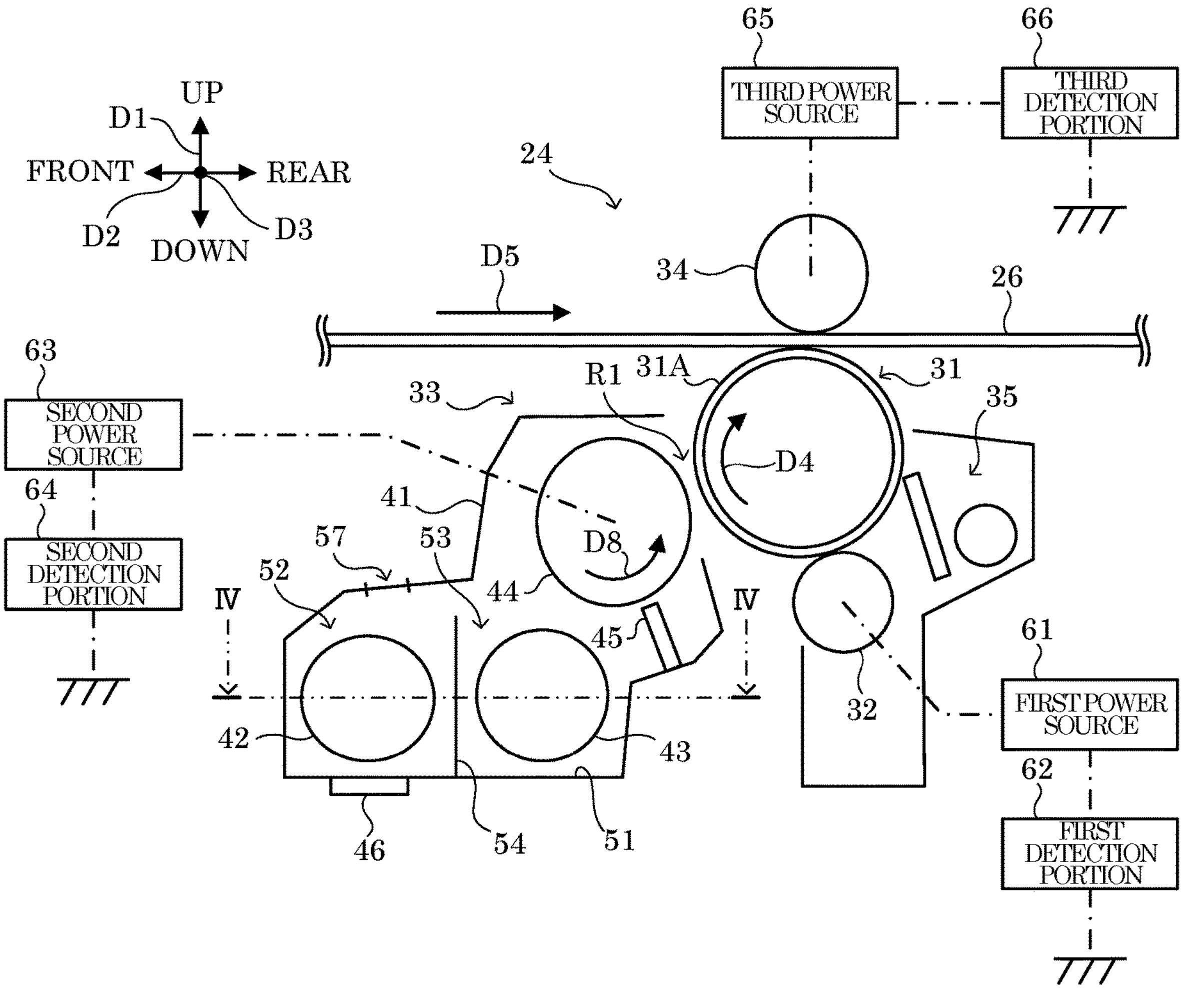
FIG. 3 is a cross-sectional view showing a configuration of an image forming unit in the image forming apparatus according to the embodiment of the present disclosure.

Next, the configuration of the image forming portion 3 will be described with reference to FIGS. 1 to 3. FIG. 3 is a cross-sectional view showing the configuration of an image forming unit 24. In FIG. 3, a current carrying path passing through a charging roller 32 and a first power source 61, a current carrying path passing through a developing roller 44 and a second power source 63, and a current carrying path passing through a primary transfer roller 34 and a third power source 65 are indicated by dash-dot lines.

As shown in FIG. 1, the image forming portion 3 includes a plurality of image forming units 21 to 24, a laser scanning unit 25, an intermediate transfer belt 26, a secondary transfer roller 27, a fixing device 28, and a sheet discharge tray 29, The image forming unit 21 forms toner images of yellow (Y). The image forming unit 22 forms toner images of cyan (C). The image forming unit 23 forms toner images of magenta (M). The image forming unit 24 forms toner images of black (K). As shown in FIG. 1, the image forming units 21 to 24 are arranged side by side in the front-rear direction D2 of the image forming apparatus 100 in the order of yellow, cyan, magenta, and black from the front side of the image forming apparatus 100.

As shown in FIG. 3, the image forming unit 24 includes a photoconductor drum 31, the charging roller 32, a developing device 33, the primary transfer roller 34, and a drum cleaning member 35. In addition, the image forming units 21 to 23 have configurations similar to that of the image forming unit 24.

An electrostatic latent image is formed on the surface of the photoconductor drum 31. The photoconductor drum 31 includes a surface layer 31A. The photoconductor drum 31 is an example of an image-carrying member of the present disclosure.

For example, the surface layer 31A is formed from an organic photosensitive material. The surface layer 31A may be formed from a photosensitive material different from the organic photosensitive material. For example, the surface layer 31A may be formed from amorphous silicon.

The photoconductor drum 31 is rotatable around a rotation axis parallel to the left-right direction D3. The photoconductor drum 31 rotates in a rotation direction D4 shown in FIG. 3 under the rotational driving force supplied from a motor (not shown). Thus, the photoconductor drum 31 conveys the electrostatic latent image formed on the surface thereof.

The charging roller 32 electrically charges the surface layer 31A of the photoconductor drum 31. The charging roller 32 is an example of a charging member of the present disclosure.

The charging roller 32 is in contact with the surface layer 31A of the photoconductor drum 31. The charging roller 32 is driven to rotate as the photoconductor drum 31 rotates. The charging roller 32 electrically charges the surface layer 31A of the photoconductor drum 31 in response to application of a preset charging bias voltage. For example, the charging roller 32 positively charges the surface layer 31A of the photoconductor drum 31.

The surface layer 31A of the photoconductor drum 31 charged by the charging roller 32 is exposed to light beams, based on image data, emitted by the laser scanning unit 25. This forms the electrostatic latent image on the surface layer 31A of the photoconductor drum 31.

The developing device 33 develops the electrostatic latent image formed on the surface layer 31A of the photoconductor drum 31 using developer that contains toner and carrier. This forms a toner image on the surface layer 31A of the photoconductor drum 31.

The primary transfer roller 34 transfers the toner image formed on the surface layer 31A of the photoconductor drum 31 by the developing device 33 to the intermediate transfer belt 26.

The primary transfer roller 34 is in contact with the inner peripheral surface of the intermediate transfer belt 26. In addition, the primary transfer roller 34 faces the surface layer 31A of the photoconductor drum 31 with the intermediate transfer belt 26 therebetween. The primary transfer roller 34 is driven to rotate as the intermediate transfer belt 26 rotates. The primary transfer roller 34 transfers the toner image formed on the surface layer 31A of the photoconductor drum 31 to the outer peripheral surface of the intermediate transfer belt 26 in response to application of a preset primary transfer bias voltage.

The drum cleaning member 35 removes remaining toner from the surface of the photoconductor drum 31 after the toner image is transferred by the primary transfer roller 34.

The image forming portion 3 includes toner containers 36 (see FIG. 1) respectively corresponding to the image forming units 21 to 24. In addition, the image forming portion 3 includes the first power sources 61 (see FIG. 2), first detection portions 62 (see FIG. 2), the second power sources 63 (see FIG. 2), second detection portions 64 (see FIG. 2), the third power sources 65 (see FIG. 2), and third detection portions 66 (see FIG. 2) respectively corresponding to the image forming units 21 to 24.

Here, the toner container 36, the first power source 61, the first detection portion 62, the second power source 63, the second detection portion 64, the third power source 65, and the third detection portion 66 corresponding to the image forming unit 24 will be described.

The toner container 36 stores toner of black (K). The toner container 36 supplies the toner of black (K) to the developing device 33 of the image forming unit 24.

The first power source 61 (see FIG. 3) applies the charging bias voltage to the charging roller 32. Specifically, the charging bias voltage includes a direct current (DC) component. For example, the charging bias voltage includes a positive DC component.

The first detection portion 62 (see FIG. 3) detects current flowing through the charging roller 32. As shown in FIG. 3, the first detection portion 62 is disposed on the current carrying path passing through the charging roller 32 and the first power source 61. The first detection portion 62 inputs an electrical signal indicating the current value of the detected current to the control portion 7.

The second power source 63 (see FIG. 3) applies a preset development bias voltage to the developing roller 44 (see FIG. 3) of the developing device 33. Specifically, the development bias voltage includes a DC component and an alternating current (AC) component. For example, the development bias voltage includes a positive DC component and an AC component with a rectangular waveform.

The second power source 63 can separately output the DC component and the AC component included in the development bias voltage. In addition, the second power source 63 can adjust the voltage value of the DC component included in the development bias voltage within a preset range.

The second detection portion 64 (see FIG. 3) detects current flowing through the developing roller 44. As shown in FIG. 3, the second detection portion 64 is disposed on the current carrying path passing through the developing roller 44 and the second power source 63. The second detection portion 64 inputs an electrical signal indicating the current value of the detected current to the control portion 7.

The third power source 65 (see FIG. 3) applies the primary transfer bias voltage to the primary transfer roller 34. Specifically, the primary transfer bias voltage includes a DC component. For example, the primary transfer bias voltage includes a negative DC component.

The third detection portion 66 (see FIG. 3) detects current flowing through the primary transfer roller 34. As shown in FIG. 3, the third detection portion 66 is disposed on the current carrying path passing through the primary transfer roller 34 and the third power source 65. The third detection portion 66 inputs an electrical signal indicating the current value of the detected current to the control portion 7.

The laser scanning unit 25 emits light that illuminates the charged area, formed by the charging roller 32, on the surface layer 31A of the photoconductor drum 31. The laser scanning unit 25 is an example of a light emitting portion of the present disclosure.

Specifically, the laser scanning unit 25 emits light based on the image data to the surface layers 31A of the photoconductor drums 31 in the respective image forming units 21 to 24.

The intermediate transfer belt 26 is an endless belt member to which the toner images formed on the surfaces of the photoconductor drums 31 in the respective image forming units 21 to 24 are transferred. The intermediate transfer belt 26 is stretched by a drive roller and a tension roller with a predetermined tension. The intermediate transfer belt 26 rotates in a rotation direction D5 shown in FIG. 3 as the drive roller rotates under the rotational driving force supplied from a motor (not shown).

The secondary transfer roller 27 transfers the toner images from the surface of the intermediate transfer belt 26 to a sheet supplied from the sheet feed portion 4.

The fixing device 28 fixes the toner images transferred to the sheet by the secondary transfer roller 27 onto the sheet.

The sheet with the toner images fixed thereon by the fixing device 28 is discharged to the sheet discharge tray 29.

Configuration of Developing Device 33

Next, the configuration of the developing device 33 in the image forming unit 24 will be described with reference to FIGS. 3 and 4. The developing devices 33 in the image forming units 21 to 23 also have configurations similar to that of the developing device 33 described below.

Figure 4:
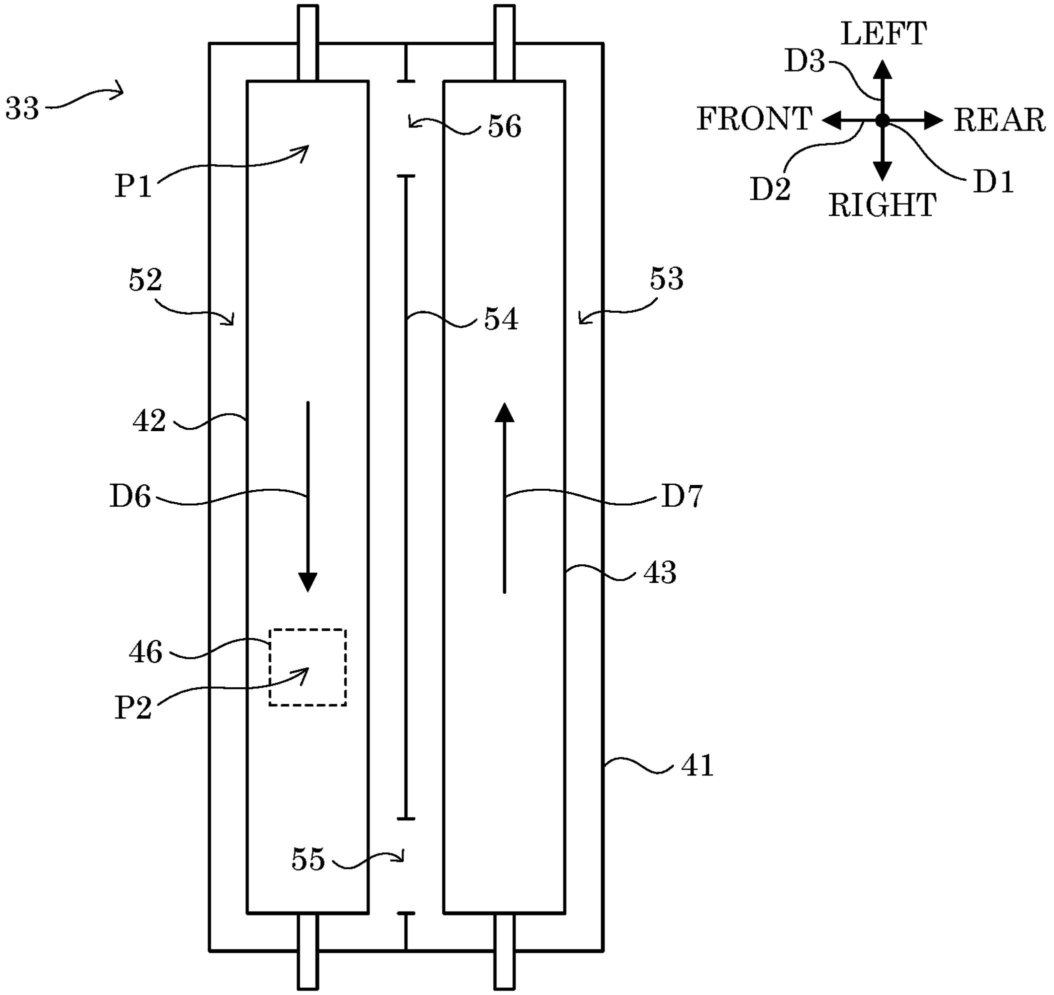
FIG. 4 is a cross-sectional view taken along line IV-IV in FIG. 3.

As shown in FIGS. 3 and 4, the developing device 33 includes a housing 41, a first conveyance member 42, a second conveyance member 43, the developing roller 44, a restricting member 45, and a toner sensor 46.

The housing 41 houses the first conveyance member 42, the second conveyance member 43, the developing roller 44, and the restricting member 45. The housing 41 also stores the developer. The housing 41 extends in the left-right direction D3.

As shown in FIGS. 3 and 4, the housing 41 includes a first conveyance path 52 and a second conveyance path 53 extending in the left-right direction D3. Specifically, a partition 54 (see FIG. 4) that partitions a lower part of the housing 41 into the first conveyance path 52 and the second conveyance path 53 is disposed on the bottom surface 51 of the housing 41.

The first conveyance member 42 conveys the developer stored in the first conveyance path 52 in a conveying direction D6 (see FIG. 4) along the first conveyance path 52. In addition, the first conveyance member 42 stirs the developer to triboelectrically charge the toner and the carrier contained in the developer. For example, the first conveyance member 42 is a screw-shaped member disposed in the first conveyance path 52 to be rotatable around a rotation axis along the first conveyance path 52. The first conveyance member 42 rotates under the rotational driving force supplied from a motor (not shown), thereby conveying and stirring the developer. For example, the toner contained in the developer stirred by the first conveyance member 42 is positively charged by the friction with the carrier contained in the developer.

The second conveyance member 43 conveys the developer stored in the second conveyance path 53 in a conveying direction D7 (see FIG. 4) along the second conveyance path 53. In addition, the second conveyance member 43 stirs the developer to triboelectrically charge the toner and the carrier contained in the developer. For example, the second conveyance member 43 is a screw-shaped member disposed in the second conveyance path 53 to be rotatable around a rotation axis along the second conveyance path 53. The second conveyance member 43 rotates under the rotational driving force supplied from a motor (not shown), thereby conveying and stirring the developer.

A first path 55 (see FIG. 4) leading to the second conveyance path 53 is disposed at the downstream end, in the conveying direction D6, of the first conveyance path 52. In addition, a second path 56 (see FIG. 4) leading to the first conveyance path 52 is disposed at the downstream end, in the conveying direction D7, of the second conveyance path 53. The first conveyance path 52, the first path 55, the second conveyance path 53, and the second path 56 form a circulating conveyance path in which the developer is circulated in one direction.

The developing roller 44 faces the photoconductor drum 31. The developing roller 44 conveys the developer to a facing portion R1 (see FIG. 3) between itself and the photoconductor drum 31. The developing roller 44 is an example of a developing member of the present disclosure.

As shown in FIG. 3, the developing roller 44 faces the second conveyance path 53 and the photoconductor drum 31. The developing roller 44 draws up the developer from the second conveyance path 53. The developer drawn up by the developing roller 44 forms a developer layer on the outer peripheral surface of the developing roller 44.

The developing roller 44 is rotatably supported by the housing 41. The developing roller 44 rotates in a rotation direction D8 shown in FIG. 3 under the rotational driving force supplied from a motor (not shown). Thus, the developing roller 44 conveys the developer layer formed on the outer peripheral surface thereof to the facing portion R1.

As the photoconductor drum 31 rotates, the electrostatic latent image formed on the surface layer 31A of the photoconductor drum 31 is conveyed to the facing portion R1. Here, the electrostatic latent image includes an exposed area and an unexposed area. The exposed area is an area illuminated with the light emitted by the laser scanning unit 25 in the charged area, charged by the charging roller 32, on the surface layer 31A of the photoconductor drum 31. In addition, the unexposed area is an area that is not illuminated with the light emitted by the laser scanning unit 25 in the charged area.

When the development bias voltage is applied to the developing roller 44, a first electric field that causes toner included in the developer layer to move to the exposed area is generated between the developing roller 44 and the exposed area that face each other at the facing portion R1. In addition, when the development bias voltage is applied to the developing roller 44, a second electric field that causes the toner included in the developer layer to move to the developing roller 44 is generated between the developing roller 44 and the unexposed area that face each other at the facing portion R1. The toner included in the developer layer is selectively moved to the exposed area formed on the surface layer 31A of the photoconductor drum 31 by the effect of the first electric field and the second electric field generated at the facing portion R1. Thus, the electrostatic latent image formed on the surface layer 31A of the photoconductor drum 31 is developed.

The restricting member 45 restricts the thickness of the developer layer formed on the outer peripheral surface of the developing roller 44. As shown in FIG. 3, the restricting member 45 is disposed downstream, in the rotation direction D8, of a position where the second conveyance member 43 and the developing roller 44 face each other and upstream, in the rotation direction D8, of the facing portion R1. The restricting member 45 faces the outer peripheral surface of the developing roller 44 such that a predetermined gap is left between the restricting member 45 and the outer peripheral surface of the developing roller 44.

An opening 57 is provided at an upper part of the first conveyance path 52. As shown in FIG. 3, the opening 57 is provided in an outer wall of the housing 41 that covers the upper part of the first conveyance path 52. The opening 57 faces the upstream end, in the conveying direction D6, of the first conveyance path 52. The toner supplied from the toner container 36 is carried through the opening 57 to a carry-in position P1 (see FIG. 4) facing the opening 57 in the first conveyance path 52.

The toner sensor 46 detects toner at a detection position P2 (see FIG. 4) downstream, in the conveying direction D6, of the carry-in position P1 in the first conveyance path 52. For example, as shown in FIG. 3, the toner sensor 46 is disposed on a bottom part of the housing 41. For example, the toner sensor 46 is a permeability sensor including an LC oscillator circuit that outputs an electrical signal according to the permeability of the developer stored inside the housing 41. The control portion 7 uses the toner sensor 46 to control toner supply from the toner container 36 to the developing device 33.

A known image forming apparatus according to a related art can calculate the potential value of the exposed area on the photoconductor drum 31. Specifically, in the image forming apparatus, a transfer current flowing in the primary transfer roller 34 and varying depending on a transfer voltage, which is applied to the primary transfer roller 34 and changed in a phased manner, and a charging current flowing in the charging roller 32 are acquired for each of two charging voltages applied to the charging roller 32 for calculation of the potential value of the exposed area.

However, in the image forming apparatus according to the related art, the process of calculating the potential value of the exposed area is complicated.

In contrast, in the image forming apparatus 100 according to the embodiment of the present disclosure, the potential value of the exposed area on the photoconductor drum 31 can be acquired with simple processes as described below.

Configuration of Control Portion 7

Next, the configuration of the control portion 7 will be described with reference to FIG. 2.

As shown in FIG. 2, the control portion 7 includes a second detection processing portion 71, a first detection processing portion 72, an acquisition processing portion 73, an adjustment processing portion 74, and a determination processing portion 75.

Specifically, the ROM 12 of the control portion 7 stores in advance a light level adjustment program for causing the CPU 11 to function as the above-described portions. The CPU 11 executes the light level adjustment program stored in the ROM 12 to function as the above-described portions.

The light level adjustment program is recorded in a computer-readable recording medium, such as a CD, a DVD, and a flash memory, and may be read from the recording medium to be stored in a storage device such as the memory portion 6. In addition, part or all of the second detection processing portion 71, the first detection processing portion 72, the acquisition processing portion 73, the adjustment processing portion 74, and the determination processing portion 75 may be composed of an electronic circuit such as an integrated circuit (ASIC).

The following describes an example of the portions included in the image forming unit 24 and the portions corresponding to the image forming unit 24 among the image forming units 21 to 24. The description below also applies to the image forming units 21 to 23.

When a DC voltage is not applied to the developing roller 44, the second detection processing portion 71 detects a second development current flowing through the facing portion R1 (see FIG. 3) including the developer and an uncharged area, which is not charged by the charging roller 32, on the photoconductor drum 31.

For example, the second detection processing portion 71 detects the second development current when a preset adjustment timing arrives. For example, the adjustment timing is a timing when the number of pages printed by the image forming apparatus 100 exceeds multiples of a preset specific number of pages. The adjustment timing may be a timing when the image forming apparatus 100 is powered on, for example.

For example, the second detection processing portion 71 detects the second development current using the following procedure.

First, the second detection processing portion 71 conveys the uncharged area on the photoconductor drum 31 to the facing portion R1 and, at the same time, conveys the developer to the facing portion R1. Specifically, the second detection processing portion 71 rotates the photoconductor drum 31 while the output from the first power source 61 and the laser scanning unit 25 is halted. In addition, the second detection processing portion 71 drives the developing device 33. The second detection processing portion 71 may eliminate static charge from the uncharged area conveyed to the facing portion R1 using the laser scanning unit 25 or a static eliminator (not shown) that eliminates static charge from the surface layer 31A of the photoconductor drum 31.

Next, the second detection processing portion 71 causes the second power source 63 to apply an AC voltage to the developing roller 44 while the uncharged area and the developer lie at the facing portion R1. Specifically, the second detection processing portion 71 causes the second power source 63 to output the AC component included in the development bias voltage.

The second detection processing portion 71 then detects the second development current flowing through the current carrying path that passes through the second power source 63 and the developing roller 44 in response to the application of the AC voltage using the second detection portion 64. The second detection processing portion 71 may detect the second development current flowing through the current carrying path that passes through the second power source 63 and the developing roller 44 while the AC voltage is not applied to the developing roller 44.

The first detection processing portion 72 detects a first development current for each of a plurality of specific voltages with different DC voltage values applied to the developing roller 44. The first development current flows through the facing portion R1 (see FIG. 3) including the developer and a preset specific exposed area, formed by the laser scanning unit 25, on the photoconductor drum 31 in response to the application of the specific voltages.

Specifically, the developer layer formed on the surface of the developing roller 44 faces a facing area on the photoconductor drum 31, and the specific exposed area is the exposed area that occupies the facing area entirely in the width direction of the photoconductor drum 31. That is, the specific exposed area is the exposed area facing the entire part, in the width direction, of the developer layer. The width direction corresponds to the axial direction (left-right direction D3) of the rotation axis of the photoconductor drum 31. The size, in the width direction, of the specific exposed area may be the same as or larger than that of the facing area.

For example, the specific voltages include a DC component and an AC component. The specific voltages may include only the DC component in a case where the second development current flows through the current carrying path passing through the second power source 63 and the developing roller 44 while the AC voltage is not applied to the developing roller 44.

For example, the first detection processing portion 72 detects the first development current when the second development current is detected by the second detection processing portion 71.

For example, the first detection processing portion 72 detects the first development current using the following procedure.

First, the first detection processing portion 72 conveys the specific exposed area formed on the photoconductor drum 31 to the facing portion R1 and, at the same time, conveys the developer to the facing portion R1. Specifically, the first detection processing portion 72 causes the first power source 61 to apply the charging bias voltage to the charging roller 32 and rotates the photoconductor drum 31. In addition, the first detection processing portion 72 causes the laser scanning unit 25 to emit light that illuminates an area on which the specific exposed area is formed so that the laser scanning unit 25 forms the specific exposed area. In addition, the first detection processing portion 72 drives the developing device 33.

Next, the first detection processing portion 72 causes the second power source 63 to output any of the specific voltages while the specific exposed area and the developer lie at the facing portion R1. Specifically, the first detection processing portion 72 causes the second power source 63 to output the development bias voltage including the DC component of which the voltage value is adjusted.

The first detection processing portion 72 then detects the first development current flowing through the current carrying path that passes through the second power source 63 and the developing roller 44 in response to the application of the specific voltages using the second detection portion 64.

Figures 5, 6:
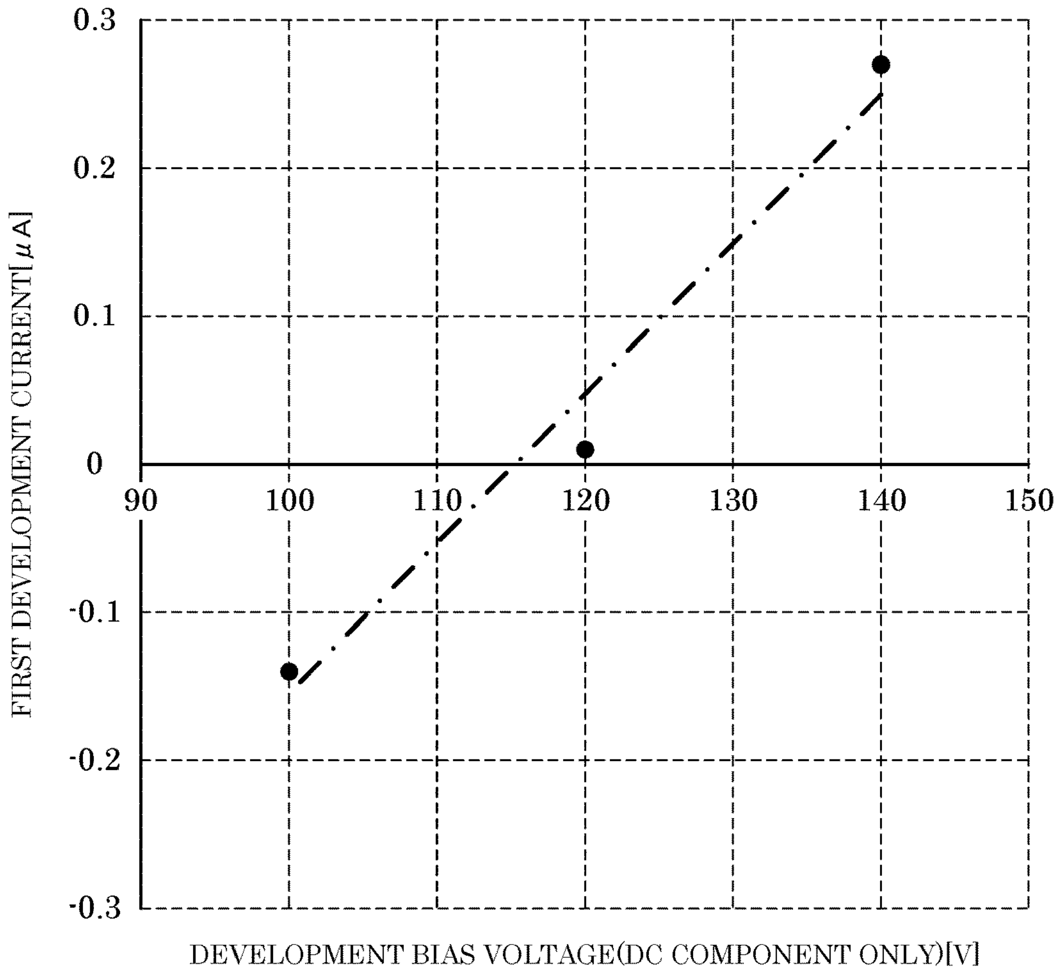
FIG. 5 shows a first development current detected in the image forming apparatus according to the embodiment of the present disclosure.
FIG. 6 shows a relationship between a DC component of a development bias voltage and the first development current detected in the image forming apparatus according to the embodiment of the present disclosure.

FIG. 5 shows an example of the first development current detected by the first detection processing portion 72 for each of the plurality of specific voltages with different DC voltage values.

The acquisition processing portion 73 acquires the potential value of the specific exposed area based on the DC voltage values of the specific voltages and the current values of the first development current, detected by the first detection processing portion 72, corresponding to the respective specific voltages.

Here, the relationship between the first development current and the potential difference between the developing roller 44 and the specific exposed area will be described with reference to FIG. 6. FIG. 6 shows an approximate straight line that indicates the relationship between the DC voltage values of the specific voltages and the current values of the first development current based on the data shown in FIG. 5. In FIG. 6, the approximate straight line is indicated by a dash-dot line.

When the potential difference between the developing roller 44 and the specific exposed area is small, the first development current including a first toner current and a first carrier current described below flows. The first toner current flows as the toner lying at the facing portion R1 mechanically adheres to the specific exposed area. The first carrier current flows through the carrier lying at the facing portion R1. When the potential of the developing roller 44 is higher than the potential of the specific exposed area, the first carrier current flows from the developing roller 44 to the specific exposed area, whereas when the potential of the developing roller 44 is lower than the potential of the specific exposed area, the first carrier current flows from the specific exposed area to the developing roller 44.

In addition, when the potential difference between the developing roller 44 and the specific exposed area is zero, the first development current including only the first toner current flows.

Here, the second development current flowing between the developing roller 44 to which the DC voltage is not applied and the uncharged area on the photoconductor drum 31 can be regarded as the same as the first development current flowing when the potential difference between the developing roller 44 and the specific exposed area is zero.

Accordingly, the DC voltage value of the specific voltage on the approximate straight line shown in FIG. 6 corresponding to the current value of the first development current substantially equal to the current value of the second development current detected by the second detection processing portion 71 can be assumed to be the potential value of the specific exposed area on the photoconductor drum 31.

For example, the acquisition processing portion 73 acquires the DC voltage value of a specific voltage, that is assumed based on the DC voltage values of the specific voltages and the current values of the first development current, detected by the first detection processing portion 72, corresponding to the respective specific voltages and that corresponds to the current value of the first development current of which the difference from the current value of the second development current detected by the second detection processing portion 71 is less than or equal to a preset first permissible value, as the potential value of the specific exposed area. The first permissible value may be any value including zero. The first permissible value is an example of a permissible value of the present disclosure.

It is noted that when the potential difference between the developing roller 44 and the specific exposed area is large, the first development current including a second toner current or a second carrier current described below flows. The second toner current flows as the toner lying at the facing portion R1 electrostatically adheres to the specific exposed area. The second carrier current flows as the carrier lying at the facing portion R1 electrostatically adheres to the specific exposed area. In a case where the first development current detected by the first detection processing portion 72 includes the second toner current or the second carrier current, the accuracy of the acquisition processing portion 73 in acquiring the potential value of the specific exposed area decreases.

Accordingly, it is desirable that the DC voltage values of the specific voltages be determined within a preset specific range so that the first development current detected by the first detection processing portion 72 does not include the second toner current or the second carrier current. For example, the specific range is based on the potential value of the specific exposed area last acquired by the acquisition processing portion 73. For example, the specific range is a range of ±25 V (volts) centered on the potential value of the specific exposed area last acquired by the acquisition processing portion 73. The specific range may be a range centered on a predicted value of the potential of the exposed area calculated based on the potential value of the specific exposed area last acquired by the acquisition processing portion 73.

It is noted that the first toner current is very small and may be ignored. That is, the acquisition processing portion 73 may acquire the DC voltage value of the specific voltage, assumed based on the DC voltage values of the specific voltages and the current values of the first development current, detected by the first detection processing portion 72, corresponding to the respective specific voltages, when the current value of the first development current is zero as the potential value of the specific exposed area. In this case, the control portion 7 does not need to include the second detection processing portion 71.

The adjustment processing portion 74 adjusts the amount of light emitted from the laser scanning unit 25 based on the potential value of the specific exposed area acquired by the acquisition processing portion 73.

Specifically, the adjustment processing portion 74 increases the amount of light when the potential value of the specific exposed area acquired by the acquisition processing portion 73 exceeds a preset reference value while the amount of light emitted from the laser scanning unit 25 does not reach a preset upper limit.

The determination processing portion 75 determines that the timing of replacing the photoconductor drum 31 has arrived when the potential value of the specific exposed area acquired by the acquisition processing portion 73 exceeds the reference value and, at the same time, when the amount of light emitted from the laser scanning unit 25 reaches the upper limit.

Light Level Adjustment Process

Figure 7:
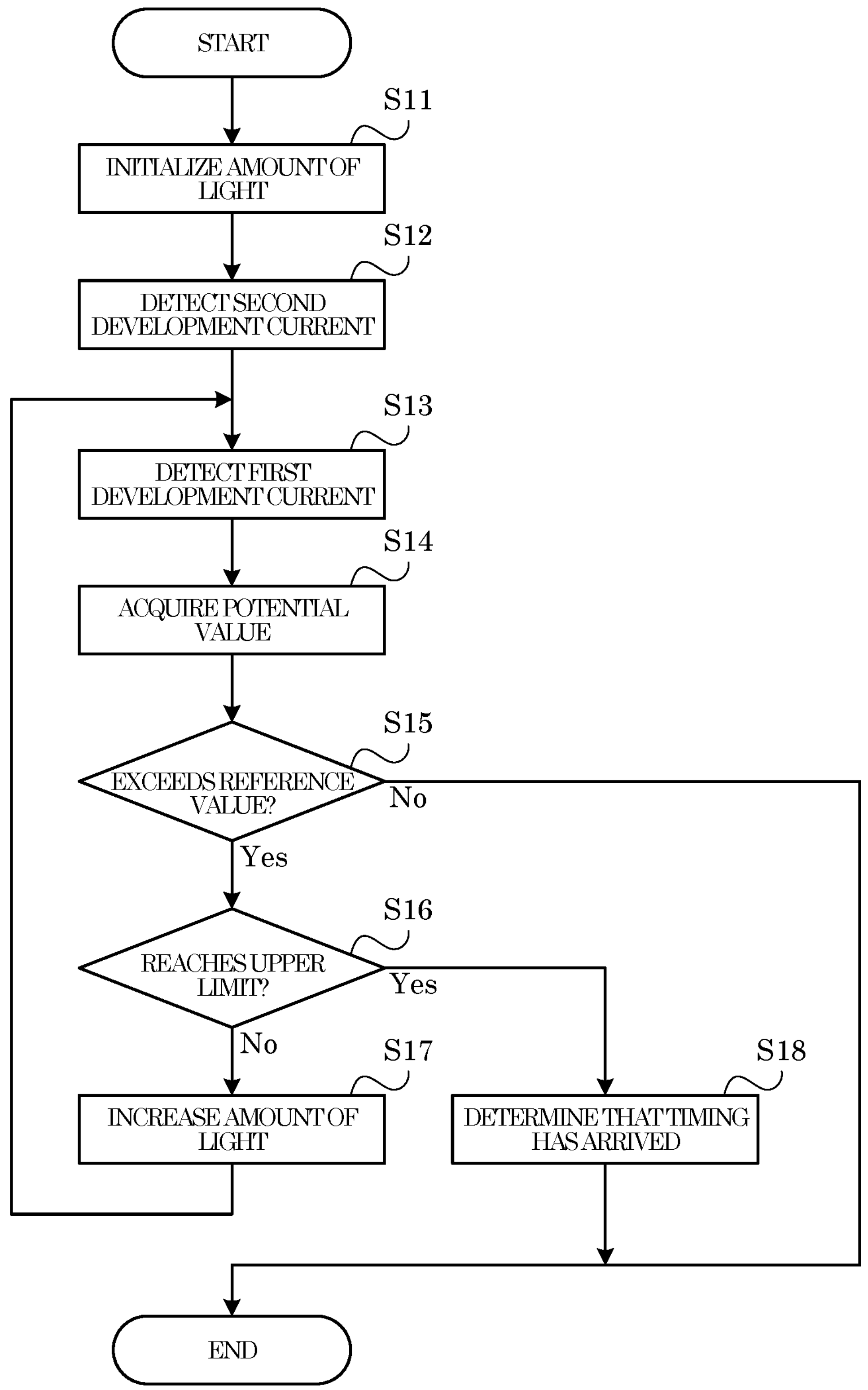
FIG. 7 is a flowchart showing an example of a light level adjustment process executed in the image forming apparatus according to the embodiment of the present disclosure.

A potential value acquisition method of the present disclosure will now be described with reference to FIG. 7 using an example of a procedure of a light level adjustment process executed by the control portion 7 in the image forming apparatus 100. Here, steps S11, S12, . . . represent the numbers of processing procedures (steps) executed by the control portion 7.

It is noted that the light level adjustment process is executed when the adjustment timing arrives.

Step S11

First, in step S11, the control portion 7 sets the amount of light emitted from the laser scanning unit 25 to a preset initial value. The initial value is lower than the upper limit.

Step S12

In step S12, the control portion 7 detects the second development current. Here, the process in step S12 is executed by the second detection processing portion 71 of the control portion 7.

Specifically, the control portion 7 detects the second development current using the following procedure.

First, the control portion 7 conveys the uncharged area on the photoconductor drum 31 to the facing portion R1 and, at the same time, conveys the developer to the facing portion R1. Specifically, the control portion 7 rotates the photoconductor drum 31 while the output from the first power source 61 and the laser scanning unit 25 is halted. In addition, the control portion 7 drives the developing device 33.

Next, the control portion 7 causes the second power source 63 to apply an AC voltage to the developing roller 44 while the uncharged area and the developer lie at the facing portion R1. Specifically, the control portion 7 causes the second power source 63 to output the AC component included in the development bias voltage.

The control portion 7 then detects the second development current flowing through the current carrying path that passes through the second power source 63 and the developing roller 44 in response to the application of the AC voltage using the second detection portion 64.

Step S13

In step S13, the control portion 7 detects the first development current for each of the plurality of specific voltages. Here, the process in step S13 is an example of a detection step of the present disclosure and is executed by the first detection processing portion 72 of the control portion 7.

Specifically, the control portion 7 detects the first development current using the following procedure.

First, the control portion 7 conveys the specific exposed area formed on the photoconductor drum 31 to the facing portion R1 and, at the same time, conveys the developer to the facing portion R1. Specifically, the control portion 7 causes the first power source 61 to apply the charging bias voltage to the charging roller 32 and rotates the photoconductor drum 31. In addition, the control portion 7 causes the laser scanning unit 25 to form the specific exposed area. In addition, the control portion 7 drives the developing device 33.

Next, the control portion 7 causes the second power source 63 to output any of the specific voltages while the specific exposed area and the developer lie at the facing portion R1. Specifically, the control portion 7 causes the second power source 63 to output the development bias voltage including the DC component of which the voltage value is adjusted.

The control portion 7 then detects the first development current flowing through the current carrying path that passes through the second power source 63 and the developing roller 44 in response to the application of the specific voltages using the second detection portion 64.

Step S14

In step S14, the control portion 7 acquires the potential value of the specific exposed area based on the DC voltage values of the specific voltages and the current values of the first development current, detected in step S13, corresponding to the respective specific voltages. Here, the process in step S14 is an example of an acquisition step of the present disclosure and is executed by the acquisition processing portion 73 of the control portion 7.

For example, the control portion 7 acquires a linear expression corresponding to the approximate straight line (see FIG. 6) that indicates the relationship between the DC voltage values of the specific voltages and the current values of the first development current based on the DC voltage values of the specific voltages and the current values of the first development current, detected in step S13, corresponding to the respective specific voltages. The control portion 7 then acquires the DC voltage value of a specific voltage, that is assumed based on the acquired linear expression and that corresponds to the current value of the first development current of which the difference from the current value of the second development current detected in step S12 is less than or equal to the first permissible value, as the potential value of the specific exposed area.

Step S15

In step S15, the control portion 7 determines whether the potential value of the specific exposed area acquired in step S14 exceeds the reference value.

Here, upon determining that the potential value of the specific exposed area acquired in step S14 exceeds the reference value (Yes in step S15), the control portion 7 moves the process to step S16. Upon determining that the potential value of the specific exposed area acquired in step S14 does not exceed the reference value (No in step S15, the control portion 7 ends the light level adjustment process.

Step S16

In step S16, the control portion 7 determines whether the amount of light emitted from the laser scanning unit 25 reaches the upper limit.

Upon determining that the amount of light emitted from the laser scanning unit 25 reaches the upper limit (Yes in step S16), the control portion 7 moves the process to step S18. Upon determining that the amount of light emitted from the laser scanning unit 25 does not reach the upper limit (No in step S16), the control portion 7 moves the process to step S17.

Step S17

In step S17, the control portion 7 increases the amount of light emitted from the laser scanning unit 25. Here, the process in step S17 is executed by the adjustment processing portion 74 of the control portion 7.

For example, the control portion 7 increases the amount of light emitted from the laser scanning unit 25 by a preset specific amount.

Step S18

In step S18, the control portion 7 determines that the timing of replacing the photoconductor drum 31 has arrived. Here, the process in step S18 is executed by the determination processing portion 75 of the control portion 7.

For example, the control portion 7 informs that the timing of replacing the photoconductor drum 31 has arrived. For example, the control portion 7 causes the operation display portion 5 to display a message that the timing of replacing the photoconductor drum 31 has arrived.

In the image forming apparatus 100, the first development current is detected for each of the plurality of specific voltages as described above. The potential value of the specific exposed area is acquired based on the DC voltage values of the specific voltages and the current values of the first development current corresponding to the respective specific voltages. Thus, the potential value of the exposed area on the photoconductor drum 31 can be acquired with simple processes compared with a configuration in which the transfer current flowing in the primary transfer roller 34 and varying depending on the transfer voltage, which is applied to the primary transfer roller 34 and changed in a phased manner, and the charging current flowing in the charging roller 32 are acquired for each of the two charging voltages applied to the charging roller 32 for calculation of the potential value of the exposed area.

Other Embodiments

The specific exposed area may be the exposed area that occupies the facing area on the photoconductor drum 31 partly in the width direction. That is, the specific exposed area may be the exposed area facing the part, in the width direction, of the developer layer.

In this case, for each of the current values of the first development current detected by the first detection processing portion 72, the acquisition processing portion 73 may execute a subtraction process of subtracting the current value of a partial current, flowing outside the specific exposed area, included in the first development current from the current value of the first development current to acquire the potential value of the specific exposed area based on the current values of the first development current after the subtraction process and the DC voltage values of the specific voltages corresponding to the respective current values of the first development current.

Specifically, the acquisition processing portion 73 may acquire the DC voltage value of a specific voltage, that is assumed based on the current values of the first development current after the subtraction process and the DC voltage values of the specific voltages corresponding to the respective current values of the first development current and that corresponds to the current value of the first development current of which the difference from the current value of a third development current included in the second development current is less than or equal to a preset second permissible value, as the potential value of the specific exposed area. Here, multiplying the current value of the second development current by the ratio of the specific exposed area to the facing area yields the current value of the third development current. In addition, the second permissible value is less than or equal to the first permissible value.

Thus, using the partial current included in the first development current detected by the first detection processing portion 72, the accuracy in acquiring the potential value of the specific exposed area can be prevented from decreasing.

For example, to detect the first development current corresponding to any of the specific voltages, the first detection processing portion 72 may detect in advance a fourth development current flowing through the facing portion R1 that includes the developer and the unexposed area and that does not include the exposed area in response to the application of the specific voltage. In addition, the acquisition processing portion 73 may acquire the current value of the partial current by multiplying the current value of the fourth development current detected by the first detection processing portion 72 by the ratio of the unexposed area included in the facing area to the facing area.

In addition, the potential of the charged area may be reduced for a reduction in the second carrier current included in the partial current. Specifically, the voltage value of the DC component included in the charging bias voltage applied to the charging roller 32 may be reduced.

The present disclosure may be applied to an image forming apparatus that forms images using single-component developer, which does not contain carrier.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus, comprising:

a charging member configured to charge an image-carrying member;

a light emitting portion configured to emit light that illuminates a charged area, formed by the charging member, on the image-carrying member;

a developing member facing the image-carrying member and configured to convey developer to a facing portion between the developing member and the image-carrying member;

a first detection processing portion configured to detect a first development current for each of a plurality of specific voltages with DC voltage values that differ from each other applied to the developing member, the first development current flowing, in response to application of the specific voltages, through the facing portion including the developer and a specific exposed area set in advance, formed by the light emitting portion, on the image-carrying member;

an acquisition processing portion configured to acquire a potential value of the specific exposed area based on the DC voltage values of the specific voltages and current values of the first development current, detected by the first detection processing portion, corresponding to the respective specific voltages; and a second detection processing portion configured to detect a second development current flowing through the facing portion including the developer and an uncharged area, which is not charged by the charging member, on the image-carrying member when a DC voltage is not applied to the developing member, wherein the acquisition processing portion acquires a DC voltage value of a specific voltage, that is assumed based on the DC voltage values of the specific voltages and the current values of the first development current, detected by the first detection processing portion, corresponding to the respective specific voltages and that corresponds to a current value of the first development current of which a difference from a current value of the second development current detected by the second detection processing portion is less than or equal to a permissible value set in advance, as the potential value of the specific exposed area.

2. The image forming apparatus according to claim 1, wherein the DC voltage values of the specific voltages are determined within a specific range based on the potential value of the specific exposed area last acquired by the acquisition processing portion.

3. The image forming apparatus according to claim 1, wherein a developer layer formed on a surface of the developing member faces a facing area on the image-carrying member, and the specific exposed area occupies the facing area entirely in a width direction of the image-carrying member.

4. The image forming apparatus according to claim 1, wherein a developer layer formed on a surface of the developing member faces a facing area on the image-carrying member, and the specific exposed area occupies the facing area partly in a width direction of the image-carrying member, and for each of the current values of the first development current detected by the first detection processing portion, the acquisition processing portion executes a subtraction process of subtracting a current value of a partial current, flowing outside the specific exposed area, included in the first development current from the current value of the first development current to acquire the potential value of the specific exposed area based on the current values of the first development current after the subtraction process and the DC voltage values of the specific voltages corresponding to the respective current values of the first development current.

5. The image forming apparatus according to claim 1, further comprising:

an adjustment processing portion configured to adjust an amount of the light based on the potential value of the specific exposed area acquired by the acquisition processing portion.

6. The image forming apparatus according to claim 5, wherein the adjustment processing portion increases the amount of the light when the potential value of the specific exposed area acquired by the acquisition processing portion exceeds a reference value set in advance while the amount of the light does not reach an upper limit set in advance, and the image forming apparatus further comprises:

a determination processing portion configured to determine that a timing of replacing the image-carrying member has arrived when the potential value of the specific exposed area acquired by the acquisition processing portion exceeds the reference value and, at the same time, when the amount of the light reaches the upper limit.

7. A potential value acquisition method executed by an image forming apparatus including a charging member configured to charge an image-carrying member; a light emitting portion configured to emit light that illuminates a charged area, formed by the charging member, on the image-carrying member; and a developing member facing the image-carrying member and configured to convey developer to a facing portion between the developing member and the image-carrying member, the method comprising:

a first detection step of detecting a first development current for each of a plurality of specific voltages with DC voltage values that differ from each other applied to the developing member, the first development current flowing, in response to application of the specific voltages, through the facing portion including the developer and a specific exposed area set in advance, formed by the light emitting portion, on the image-carrying member;

an acquisition step of acquiring a potential value of the specific exposed area based on the DC voltage values of the specific voltages and current values of the first development current, detected in the detection step, corresponding to the respective specific voltages; and a second detection step of detecting a second development current flowing through the facing portion including the developer and an uncharged area, which is not charged by the charging member, on the image-carrying member when a DC voltage is not applied to the developing member, wherein in the acquisition step, a DC voltage value of a specific voltage, that is assumed based on the DC voltage values of the specific voltages and the current values of the first development current, detected by the first detection step, corresponding to the respective specific voltages and that corresponds to a current value of the first development current of which a difference from a current value of the second development current detected by the second detection step is less than or equal to a permissible value set in advance, is acquired as the potential value of the specific exposed area.

8. An image forming apparatus, comprising:

a charging member configured to charge an image-carrying member;

a light emitting portion configured to emit light that illuminates a charged area, formed by the charging member, on the image-carrying member;

a developing member facing the image-carrying member and configured to convey developer to a facing portion between the developing member and the image-carrying member;

a first detection processing portion configured to detect a first development current for each of a plurality of specific voltages with DC voltage values that differ from each other applied to the developing member, the first development current flowing, in response to application of the specific voltages, through the facing portion including the developer and a specific exposed area set in advance, formed by the light emitting portion, on the image-carrying member; and an acquisition processing portion configured to acquire a potential value of the specific exposed area based on the DC voltage values of the specific voltages and current values of the first development current, detected by the first detection processing portion, corresponding to the respective specific voltages, wherein the DC voltage values of the specific voltages are determined within a specific range based on the potential value of the specific exposed area last acquired by the acquisition processing portion.

9. The image forming apparatus according to claim 8, wherein a developer layer formed on a surface of the developing member faces a facing area on the image-carrying member, and the specific exposed area occupies the facing area entirely in a width direction of the image-carrying member.

10. The image forming apparatus according to claim 8, wherein a developer layer formed on a surface of the developing member faces a facing area on the image-carrying member, and the specific exposed area occupies the facing area partly in a width direction of the image-carrying member, and for each of the current values of the first development current detected by the first detection processing portion, the acquisition processing portion executes a subtraction process of subtracting a current value of a partial current, flowing outside the specific exposed area, included in the first development current from the current value of the first development current to acquire the potential value of the specific exposed area based on the current values of the first development current after the subtraction process and the DC voltage values of the specific voltages corresponding to the respective current values of the first development current.

11. The image forming apparatus according to claim 8, further comprising:

an adjustment processing portion configured to adjust an amount of the light based on the potential value of the specific exposed area acquired by the acquisition processing portion.

12. The image forming apparatus according to claim 11, wherein the adjustment processing portion increases the amount of the light when the potential value of the specific exposed area acquired by the acquisition processing portion exceeds a reference value set in advance while the amount of the light does not reach an upper limit set in advance, and the image forming apparatus further comprises:

a determination processing portion configured to determine that a timing of replacing the image-carrying member has arrived when the potential value of the specific exposed area acquired by the acquisition processing portion exceeds the reference value and, at the same time, when the amount of the light reaches the upper limit.

13. A potential value acquisition method executed by an image forming apparatus including a charging member configured to charge an image-carrying member; a light emitting portion configured to emit light that illuminates a charged area, formed by the charging member, on the image-carrying member; and a developing member facing the image-carrying member and configured to convey developer to a facing portion between the developing member and the image-carrying member, the method comprising:

a detection step of detecting a first development current for each of a plurality of specific voltages with DC voltage values that differ from each other applied to the developing member, the first development current flowing, in response to application of the specific voltages, through the facing portion including the developer and a specific exposed area set in advance, formed by the light emitting portion, on the image-carrying member;

an acquisition step of acquiring a potential value of the specific exposed area based on the DC voltage values of the specific voltages and current values of the first development current, detected in the detection step, corresponding to the respective specific voltages, wherein the DC voltage values of the specific voltages are determined within a specific range based on the potential value of the specific exposed area last acquired by the acquisition step.

14. An image forming apparatus, comprising:

a charging member configured to charge an image-carrying member;

a light emitting portion configured to emit light that illuminates a charged area, formed by the charging member, on the image-carrying member;

a developing member facing the image-carrying member and configured to convey developer to a facing portion between the developing member and the image-carrying member;

a first detection processing portion configured to detect a first development current for each of a plurality of specific voltages with DC voltage values that differ from each other applied to the developing member, the first development current flowing, in response to application of the specific voltages, through the facing portion including the developer and a specific exposed area set in advance, formed by the light emitting portion, on the image-carrying member; and an acquisition processing portion configured to acquire a potential value of the specific exposed area based on the DC voltage values of the specific voltages and current values of the first development current, detected by the first detection processing portion, corresponding to the respective specific voltages, wherein a developer layer formed on a surface of the developing member faces a facing area on the image-carrying member, and the specific exposed area occupies the facing area partly in a width direction of the image-carrying member, and for each of the current values of the first development current detected by the first detection processing portion, the acquisition processing portion executes a subtraction process of subtracting a current value of a partial current, flowing outside the specific exposed area, included in the first development current from the current value of the first development current to acquire the potential value of the specific exposed area based on the current values of the first development current after the subtraction process and the DC voltage values of the specific voltages corresponding to the respective current values of the first development current.

15. The image forming apparatus according to claim 14, further comprising:

an adjustment processing portion configured to adjust an amount of the light based on the potential value of the specific exposed area acquired by the acquisition processing portion.

16. The image forming apparatus according to claim 15, wherein the adjustment processing portion increases the amount of the light when the potential value of the specific exposed area acquired by the acquisition processing portion exceeds a reference value set in advance while the amount of the light does not reach an upper limit set in advance, and the image forming apparatus further comprises:

a determination processing portion configured to determine that a timing of replacing the image-carrying member has arrived when the potential value of the specific exposed area acquired by the acquisition processing portion exceeds the reference value and, at the same time, when the amount of the light reaches the upper limit.

17. A potential value acquisition method executed by an image forming apparatus including a charging member configured to charge an image-carrying member; a light emitting portion configured to emit light that illuminates a charged area, formed by the charging member, on the image-carrying member; and a developing member facing the image-carrying member and configured to convey developer to a facing portion between the developing member and the image-carrying member, the method comprising:

a detection step of detecting a first development current for each of a plurality of specific voltages with DC voltage values that differ from each other applied to the developing member, the first development current flowing, in response to application of the specific voltages, through the facing portion including the developer and a specific exposed area set in advance, formed by the light emitting portion, on the image-carrying member; and an acquisition step of acquiring a potential value of the specific exposed area based on the DC voltage values of the specific voltages and current values of the first development current, detected in the detection step, corresponding to the respective specific voltages, wherein a developer layer formed on a surface of the developing member faces a facing area on the image-carrying member, and the specific exposed area occupies the facing area partly in a width direction of the image-carrying member, and in the acquisition step, for each of the current values of the first development current detected by the detection step, a subtraction process of subtracting a current value of a partial current, flowing outside the specific exposed area, included in the first development current from the current value of the first development current is executed to acquire the potential value of the specific exposed area based on the current values of the first development current after the subtraction process and the DC voltage values of the specific voltages corresponding to the respective current values of the first development current.

18. An image forming apparatus, comprising:

a charging member configured to charge an image-carrying member;

a light emitting portion configured to emit light that illuminates a charged area, formed by the charging member, on the image-carrying member;

a developing member facing the image-carrying member and configured to convey developer to a facing portion between the developing member and the image-carrying member;

a first detection processing portion configured to detect a first development current for each of a plurality of specific voltages with DC voltage values that differ from each other applied to the developing member, the first development current flowing, in response to application of the specific voltages, through the facing portion including the developer and a specific exposed area set in advance, formed by the light emitting portion, on the image-carrying member;

an acquisition processing portion configured to acquire a potential value of the specific exposed area based on the DC voltage values of the specific voltages and current values of the first development current, detected by the first detection processing portion, corresponding to the respective specific voltages; and an adjustment processing portion configured to adjust an amount of the light based on the potential value of the specific exposed area acquired by the acquisition processing portion, wherein the adjustment processing portion increases the amount of the light when the potential value of the specific exposed area acquired by the acquisition processing portion exceeds a reference value set in advance while the amount of the light does not reach an upper limit set in advance, and the image forming apparatus further comprises:

a determination processing portion configured to determine that a timing of replacing the image-carrying member has arrived when the potential value of the specific exposed area acquired by the acquisition processing portion exceeds the reference value and, at the same time, when the amount of the light reaches the upper limit.

19. A potential value acquisition method executed by an image forming apparatus including a charging member configured to charge an image-carrying member; a light emitting portion configured to emit light that illuminates a charged area, formed by the charging member, on the image-carrying member; and a developing member facing the image-carrying member and configured to convey developer to a facing portion between the developing member and the image-carrying member, the method comprising:

a detection step of detecting a first development current for each of a plurality of specific voltages with DC voltage values that differ from each other applied to the developing member, the first development current flowing, in response to application of the specific voltages, through the facing portion including the developer and a specific exposed area set in advance, formed by the light emitting portion, on the image-carrying member;

an acquisition step of acquiring a potential value of the specific exposed area based on the DC voltage values of the specific voltages and current values of the first development current, detected in the detection step, corresponding to the respective specific voltages; and an adjustment step of adjusting an amount of the light based on the potential value of the specific exposed area acquired by the acquisition step, wherein in the adjustment step, the amount of the light is increased when the potential value of the specific exposed area acquired by the acquisition step exceeds a reference value set in advance while the amount of the light does not reach an upper limit set in advance, and the method further comprises:

a determination step of determining that a timing of replacing the image-carrying member has arrived when the potential value of the specific exposed area acquired by the acquisition step exceeds the reference value and, at the same time, when the amount of the light reaches the upper limit.

* * * * *